United States Patent [19]

Tabei et al.

[11] Patent Number: 4,821,088
[45] Date of Patent: Apr. 11, 1989

[54] SOLID-STATE COLOR IMAGE PICKUP UNIT WITH MOSAIC COLOR FILTER AND TWO HORIZONTAL OUTPUT REGISTERS

[75] Inventors: Masatoshi Tabei; Kazuhiro Kawajiri, both of Kanagawa, Japan

[73] Assignee: Fuji Photo Film Co., Ltd., Kanagawa, Japan

[21] Appl. No.: 126,146

[22] Filed: Nov. 27, 1987

[30] Foreign Application Priority Data

Nov. 27, 1986 [JP] Japan ............................... 61-280791
Dec. 4, 1986 [JP] Japan ............................... 61-287600

[51] Int. Cl.$^4$ ..................... H04N 9/077; H04N 9/07
[52] U.S. Cl. ........................................ 358/48; 358/44
[58] Field of Search ..................... 358/41, 43, 44, 48

[56] References Cited

U.S. PATENT DOCUMENTS

| | | | |
|---|---|---|---|
| 4,047,203 | 9/1977 | Dillon | 358/44 |
| 4,054,915 | 10/1977 | Sugihara | 358/41 |
| 4,293,871 | 10/1981 | Macovski | 358/44 |
| 4,453,177 | 6/1984 | Berger et al. | 358/48 |
| 4,495,516 | 1/1985 | Moore et al. | 358/44 |
| 4,553,159 | 11/1985 | Moraillon | 358/44 |

FOREIGN PATENT DOCUMENTS

| | | | |
|---|---|---|---|
| 53-79435 | 7/1978 | Japan | 358/44 |
| 59-104881 | 6/1984 | Japan | 358/48 |
| 59-108469 | 6/1984 | Japan | 358/48 |
| 59-108490 | 6/1984 | Japan | 358/48 |
| 59-108491 | 6/1984 | Japan | 358/48 |

Primary Examiner—James J. Groody
Assistant Examiner—Randall S. Svihla
Attorney, Agent, or Firm—Sughrue, Mion, Zinn, Macpeak & Seas

[57] ABSTRACT

A solid-state image pickup unit in which two neighboring horizontal lines are paired for scanning. In the vertical transfer, the photocharge signals on the two lines are transferred to different horizontal CCDs, which concurrently shift out their contents. One of the two horizontal lines is used exclusively for a luminance signal and the other for two color signals. The horizontal line used for color signals has alternating color filters. A switch is used to separate the two color signals resulting from these alternating color filters.

6 Claims, 2 Drawing Sheets

SOLID-STATE COLOR IMAGE PICKUP UNIT WITH MOSAIC COLOR FILTER AND TWO HORIZONTAL OUTPUT REGISTERS

BACKGROUND OF THE INVENTION

1. Field of the Invention

This invention relates to a solid-state image pickup unit in which two rows of picture elements (pixels) are assigned to each scanning line and the output signals of the two rows of picture elements are concurrently read out to form a color image with a high degree of resolution.

2. Background Art

It is well known that each picture element in a solid-state image pickup unit is designed independently and provided with a red (R), a green (G), or a blue (B) color filter so that color signals corresponding to the color filters can be read or clocked out.

Conventionally, R, G and B color filters are alternately arranged in the scanning direction of the picture elements, and the color signals from the elements are read out in this order to thus provide equally weighted color signals. However, with such an arrangement of the color filters the resolution in the horizontal direction is reduced to one-third because the same color signals are obtained every three picture elements.

In order to prevent apparent degradation of the resolution, the "Bayer" arrangement is practically effective. In this arrangement, red (R) and green (G) color filters are alternately arranged on an odd-numbered scanning line, and green (G) and blue (B) color filters are alternately arranged on an even-numbered scanning line. In the Bayer arrangement, the color signals of the preceding scanning line are delayed by a 1H (one horizontal scanning period) delay line. The thus delayed color signals are combined with the color signals of the present scanning line. That is, color signals of two adjacent scanning lines are combined with each other so that R, G and B color signals are obtained at least for a period of scanning two scanning lines. The system using the Bayer arrangement itself suffers little degradation of resolution with respect to image quality and is effective in use. However, such a system needs many complicated parts such as a composing circuit of R, G and B color signals, a 1H delay line, and switching circuits, etc.

SUMMARY OF THE INVENTION

In order to solve the above problem, an object of this invention is to provide a novel solid-state image pickup unit.

A solid-state image pickup unit according to one aspect of this invention includes a solid-state image sensor comprising a photosensing portion, a charge transfer portion and a transfer controlling portion, and a mosaic microfilter arranged on the photosensing portion in correspondence with picture elements. According to the invention, two horizontal lines (rows) are assigned to each scanning line, two horizontal CCDs are used for the respective two horizontal lines and concurrently read out the luminance and color signals produced in the respective two horizontal lines. A first color filter (G, a main component of luminance) and a second color filter (R) are alternately arranged on a first line of the respective two horizontal lines. The first color filter (G) and a third color filter (B) are alternately arranged on a second line of the respective two horizontal lines. However, the first color filter (G) in the first and second lines are shifted with respect to each other by one picture element in the horizontal direction.

A solid-state image pickup unit according to another aspect of this invention includes a solid-state image sensor comprising a photosensing portion, a charge transfer portion and a transfer controlling portion, and a mosaic microfilter arranged on the photosensing portion in correspondence with picture elements. In this aspect of the invention, two horizontal lines (rows) used exclusively for luminance and color signals respectively are assigned to each scanning line. Two horizontal CCDs are used exclusively for the luminance and color signals respectively and concurrently read out the luminance and color signals produced in the respective two horizontal lines from the horizontal CCDs. The horizontal lines (rows) are used exclusively for the color signals having a color pattern in which two color filters (R and B) are alternately arranged in the horizontal direction and these two color filters are transposed to each other in a predetermined manner in the vertical direction.

DETAILED DESCRIPTION OF THE PREFERRED EMBODIMENT

Preferred embodiments according to this invention will be described in detail hereinafter with reference to the accompanying drawings.

Figure 1:
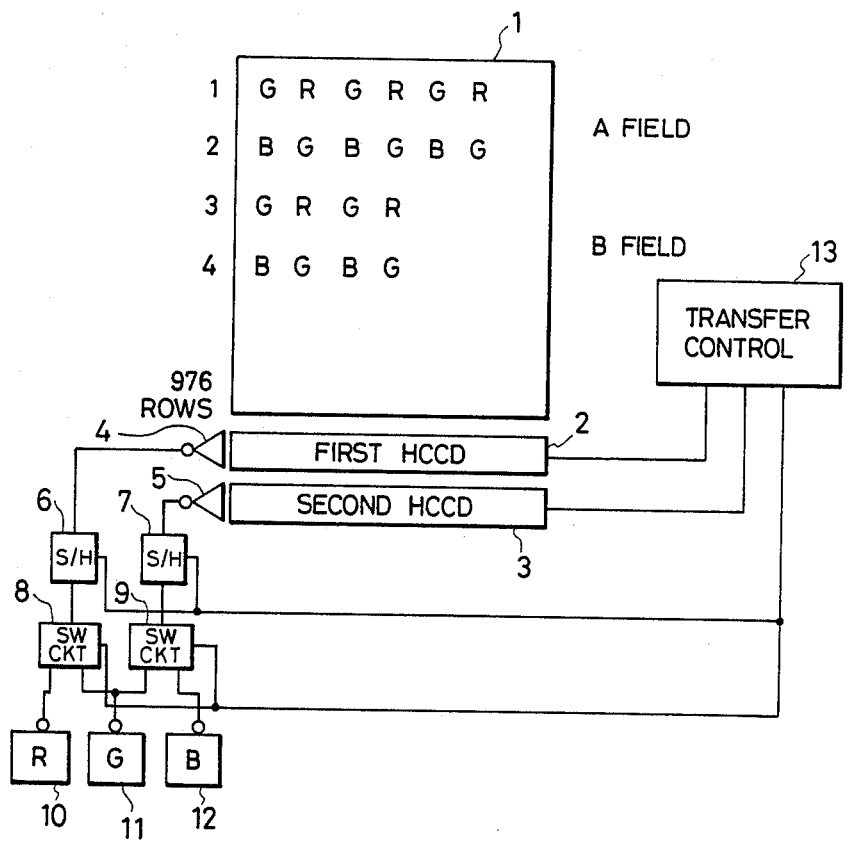
FIG. 1 is a block diagram showing a solid-state image pickup unit according to one aspect of this invention.

FIG. 1 is a block diagram showing components of an embodiment of a solid-state image pickup unit according to this invention.

In FIG. 1, a color microfilter 1 is arranged over a photosensing portion (not explicitly shown). The color microfilter 1 comprises various color filters corresponding to picture elements of the underlying photosensing portion. The differing color filters R, G and B are assigned to the corresponding picture elements on first and second horizontal rows as shown in FIG. 1. The color filter 1 according to this embodiment is provided with a color pattern in which G (green) and R (red) color filters are alternately arranged on odd-numbered rows, and B (blue) and G (green) color filters are alternately arranged on even-numbered rows.

Two adjacent rows of picture elements are paired and assigned to each scanning line. That is, the first and second rows, and the third and fourth rows, etc. are paired and assigned to the A-field and B-field respectively in the interlaced scanning of the photosensing portion.

A separate vertical CCD (charge coupled device) (not shown in FIG. 1) is disposed between adjacent columns of photoelectric conversion elements in the photosensing portion. The vertical CCD comprises cells each of which is coupled with each photoelectric conversion element to receive photo charge from that element and to shift the charges downward.

Two horizontal CCDs comprising first and second horizontal CCDs 2 and 3 are provided at the output side of each vertical CCD. The output cell of each vertical CCD is connected to each cell of the first horizontal CCD 2, and further, the cells of the first horizontal CCD 2 are connected to the corresponding cells of the second horizontal CCD 3. Signal charges outputted from the vertical CCDs are then transferred to the first horizontal CCD 2 and then transferred to the second horizontal CCD 3. The result is that the R and G signals of the odd-numbered rows are shifted to the first horizontal CCD 2 and the G and B signals of the even-numbered rows are shifted to the second horizontal CCD 3.

The output sides of the first and second horizontal CCDs 2 and 3 are separately connected through amplifiers 4 and 5, sample-hold circuits 6 and 7, and switching circuits 8 and 9 to output terminals 10, 11 and 12, respectively as shown in FIG. 1.

After signal charges produced in the two respective rows of picture elements are transferred to the first and second horizontal CCDs 2 and 3 in the manner as described above, the signal charges are concurrently read out of the first and second horizontal CCDs through the amplifiers 4 and 5. The thus amplified signal charges are stored in the sample-hold circuits 6 and 7 for a period required for reading out one picture element.

The sample-hold circuit 6 stores the signal charges corresponding to picture elements on the odd-numbered rows. A switching operation of the switching circuit 8 connected to the sample-hold circuit 6 is conducted in synchronization with a reading-out operation. That is, in every period of reading out one picture element, R and G signals are separately outputted from the first and second output terminals 10 and 11 respectively of the switching circuit 8. Similarly, since the sample-hold circuit 7 stores the signal charges corresponding to picture elements on the even-numbered rows, G and B signals are separately outputted from the first and second output terminals 11 and 12 respectively of the switching circuit 9. In this case, the second output terminal of the switching circuit 8 and the first output terminal of the switching circuit 9 are connected to each other and comprise the output terminal 11. The timing signals for the transferring, sampling and switching are provided by a transfer control circuit 13.

Figure 2:
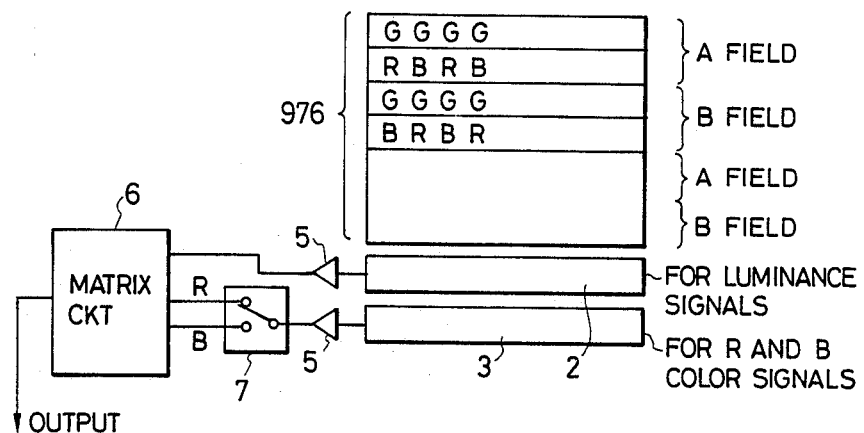
FIG. 2 is a block diagram showing a solid-state image pickup unit according to another aspect of this invention.
Figure 3:
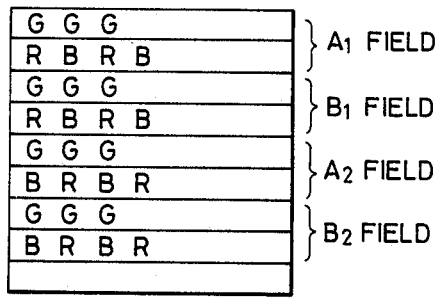
FIGS. 3 and 4 show other color patterns employed in the solid-state image pickup unit as shown in FIG. 2.
Figure 4:
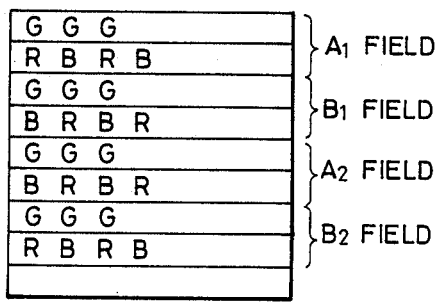

FIG. 2 is a block diagram showing components of another embodiment of another solid-state image pickup unit according to this invention, and FIGS. 3 and 4 show color patterns of microfilters employed in the solid-state image pickup unit shown in FIG. 2.

Similarly to the embodiment as shown in FIG. 1, a photosensing portion and a vertical charge transfer portion are diagrammatically shown as a block, and color filters in microfilter 1 correspond to picture elements symbolically designated by R (red), G (green) and B (blue). The transfer control circuit is not explicitly shown.

The solid-state image pickup unit is usable with the standard television system, that is, NTSC system. Accordingly, the photosensing portion comprises substantially 1,000 rows of photoelectric conversion elements in the vertical direction, and each row is provided with 500 to 800 photoelectric conversion elements in the horizontal direction.

As shown in the drawings, each pair of respective adjacent two rows designated by character A or B is assigned to each scanning line and employed as A-field or B-field in the interlaced scanning in which all A-field lines are first scanned and then the B-field lines are scanned. In the microfilter of this embodiment, each of the A and B fields comprises a first row of photoelectric conversion elements (GGG--) used exclusively for luminance signals and a second row (RBRB--) used exclusively for color signals. That is, two rows for the luminance and color signals are assigned to each scanning line to thereby concurrently read out the luminance and color signals produced in the two rows.

Each row used exclusively for color signals is provided with a color pattern in which two primary colors (R and B) are alternately arranged in such a manner that a pair (RB) is horizontally sequenced on the A-field and a pair (BR) in reverse order is sequenced on the B-field.

The solid-state imate pickup unit according to this embodiment includes a horizontal charge transfer portion comprising a first horizontal CCD 2 used exclusively for luminance signals and a second horizontal CCD 3 used exclusively for color signals.

Luminance and color signals produced in the photosensing portion 1 are transferred through the vertical charge transfer portion to the first and second horizontal CCDs 2 and 3, respectively. Both of the luminance and color signals thus transferred are concurrently read out and amplified through amplifiers 5. The amplified luminance signals are directly inputted to a matrix circuit 6 while the amplified color signals are separated into R and B color signals through a changeover switch 7 and then the R or B color signals are concurrently inputted to the matrix circuit 6. A switching operation of the changeover switch 7 is carried out every period having a frequency of $f_s/2$ thereby to separately input the R and B signals to the matrix circuit 6, where $f_s$ is a sampling frequency applied by the transfer control circuit to the horizontal CCDs 2 and 3.

The matrix circuit 6 comprises a weighted addition or subtraction circuit utilizing resistance elements as well known in the prior art.

The luminance and color signals transferred from the horizontal CCDs 2 and 3 to the matrix circuit 6 every field period are subjected to calculating operation, so that R (red), G (green) and B (blue) color signals, or Y (luminance), R-Y and B-Y signals are concurrently obtained.

A color pattern of the microfilter employed in this embodiment is not limited to that as shwon in FIG. 2. For example, the color patterns as shown in FIGS. 3 and 4 may be employed in this embodiment.

FIG. 3 shows another color pattern of a microfilter employed in the embodiment as shown in FIG. 2.

Similarly to the color pattern as shown in FIG. 2, green color filters are arranged on each row used exclusively for the luminance signals, and two color filters (e.g., R and B) are alternately arranged on each row used exclusively for color signals.

The color pattern as shown in FIG. 2 has a feature that R and B color filters are alternately arranged both horizontally and vertically in this order. However, the color pattern shown in FIG. 3 has a feature that with respect to each column, one of two color filters (R and B) is arranged on odd-numbered A and B fields and the other is arranged on even-numbered A and B fields.

FIG. 4 shows a further color pattern of the microfilter employed in this embodiment. In this color pattern, green color filters are arranged on each row used exclusively for luminance signals and two color filters (e.g., R and B) are alternately arranged on each row used exclusively for color signals, similarly to the color patterns shown in FIGS. 2 and 3. However, with respect to each column, one of the two color filters (R and B) is arranged on odd-numbered A-field and even-numbered B-field and the other is arranged on even-numbered A-field and odd-numbered B-field.

According to the color patterns as described above, the generation of color moire patterns can be prevented which frequently occurs when a conventional solid-state image pickup unit (for example, as proposed in Japanese Patent Application No. 59-223806) is read out in the interlaced scanning.

The microfilter as employed in this invention, comprises primary color elements (R, B and G). However, the microfilter according to this invention is not limited thereto. For example, complementary color elements may be employed to obtain the same effects as the primary color elements.

According to this invention, since two horizontal lines (rows) for luminance and color signals are assigned to each scanning line and two horizontal CCDs used exclusively for the two horizontal lines respectively, R, B and G signals are concurrently read out with simple and few read-out circuits.

Further, if a photosensing portion according to this invention is vertically divided into 976 rows (244×2×2), an interlaced scanning in the NTSC system can be completely carried out and, therefore, a high resolved image can be obtained in the vertical direction.

What is claimed is:

1. A solid-state image pickup unit for a color image comprising:

a solid-state image sensor comprising a photosensing portion having picture elements arranged in horizontal lines for receiving light from an object, a charge transfer portion for vertically transferring signal charges produced in said photosensing portion and a transfer controlling portion for controlling the charge transfer portion;

a mosaic microfilter composed of color filters and arranged on said photosensing portion in correspondence with said picture elements;

two horizontal CCDs for receiving signal charges from said charge transfer portion, a first one of said two horizontal CCDs transferring a plurality of signal charges in parallel to a second one of said two horizontal CCDs, pairs of adjacent horizontal lines in said photosensing portion being assigned to respective ones of a plurality of scanning lines, said transfer controlling portion controlling said charge transfer portion to concurrently transfer signal charges from the pair of horizontal lines assigned to a selected one of said scanning lines to said two horizontal CCDs, said signal charges transferred to said two horizontal CCDs being concurrently read out from said two horizontal CCDs;

sample-and-hold circuits for receiving the signal charges read out from said two horizontal CCDs and for holding said received signal charges; and switching circuits for switching said signal charges held by said sample-and-hold circuits to a plurality of outputs each time one signal charge is read out from one of said horizontal CCDs to one of said sample-and-hold circuits;

wherein color filters of a first color and color filters of a second color are alternately arranged in correspondence with picture elements of a first line of each of said pairs of horizontal lines, and color filters of said first color and color filters of a third color are alternately arranged in correspondence with picture elements of a second line of each of said pairs of horizontal lines, said color filters of said first color in said first and second lines being shifted with respect to each other by a distance corresponding to one of said picture elements in the direction of said horizontal lines.

2. A solid-state image pickup unit for a color image comprising:

a solid-state image sensor comprising a photosensing portion having picture elements arranged in horizontal lines for receiving light from an object, a charge transfer portion for vertically transferring signal charges produced in said photosensing portion and a transfer controlling portion for controlling the charge transfer portion;

a mosaic microfilter composed of color filters and arranged on said photosensing portion in correspondence with said picture elements; and two horizontal CCDs for receiving signal charges from said charge transfer portion, a first one of said two horizontal CCDs transferring a plurality of signal charges in parallel to a second one of said two horizontal CCDs, pairs of adjacent horizontal lines in said photosensing portion being assigned to respective ones of a plurality of scanning lines, said transfer controlling portion controlling said charge transfer portion to concurrently transfer signal charges from the pairs of horizontal lines assigned to a selected one of said scanning lines to said two horizontal CCDs, said signal charges transferred to said two horizontal CCDs being concurrently read out from said two horizontal CCDs;

wherein a first horizontal line of each of said pairs of horizontal lines is associated exclusively with signal charges representing one color and a second horizontal line of each of said pairs of horizontal lines is associated exclusively with signal charges representing two other colors; and wherein color filters of a first color and color filters of a second color are alternately arranged in correspondence with picture elements of said second horizontal lines, with color filters of said first and second colors in selected ones of said second horizontal lines being transposed relative to color filters of said first and second colors in other ones of said second horizontal lines, thereby forming first and second color filter patterns in said second horizontal lines.

3. A solid-state image pickup unit as claimed in claim 2, wherein sequential ones of said scanning lines are alternately assigned to an A field and a B field, and wherein color filters of ones of said second horizontal lines assigned to said scanning lines assigned to said A field are arranged in said first color filter pattern and color filters of ones of said second horizontal lines assigned to said scanning lines assigned to said B field are arranged in said second color filter pattern.

4. A solid-state image pickup unit as claimed in claim 2, wherein sequential ones of said scanning lines are alternately assigned to an A field and a B field, and wherein color filters of ones of said second horizontal lines assigned to odd-numbered ones of said scanning lines assigned to said A and B fields are arranged in said first color filter pattern and color filters of ones of said second horizontal lines assigned to even-numbered ones of said scanning lines assigned to said A and B fields are arranged in said second color filter pattern.

5. A solid-state image pickup unit as claimed in claim 2, wherein sequential ones of said scanning lines are alternately assigned to an A field and a B field, and wherein color filters of ones of said second horizontal lines assigned to odd-numbered ones of said scanning lines assigned to said A field and even-numbered ones of said scanning lines are assigned to said B field are arranged in said first color filter pattern and color filters of ones of said second horizontal lines assigned to even-numbered ones of said scanning lines assigned to said A field and odd-numbered ones of said scanning lines assigned to said B field are arranged in said second color filter pattern.

6. A solid-state image pickup unit for a color image comprising:

a solid-state image sensor comprising a photosensing portion having picture elements arranged in horizontal lines for receiving light from an object, a charge transfer portion for vertically transferring signal charges produced in said photosensing portion and a transfer controlling portion for controlling the charge transfer portion;

a mosaic microfilter composed of color filters and arranged on said photosensing portion in correspondence with said picture elements; and two horizontal CCDs for receiving signal charges from said charge transfer portion, a first one of said two horizontal CCDs transferring a plurality of signal charges in parallel to a second one of said two horizontal CCDs, pairs of adjacent horizontal lines in said photosensing portion being assigned to respective ones of a plurality of scanning lines, said transfer controlling portion controlling said charge transfer portion to concurrently transfer signal charges from the pair of horizontal lines assigned to a selected one of said scanning lines to said two horizontal CCDs, said signal charges transferred to said two horizontal CCDs being concurrently read out from said two horizontal CCDs;

wherein color filters of a first color are arranged in correspondence with all of the picture elements of a first line of each of said pairs of horizontal lines, and color filters of a second color and color filters of a third color are alternately arranged in correspondnece with picture elements of a second line of each of said pairs of horizontal lines, with color filters of said first and second colors in selected ones of said second horizontal lines being transposed relative to color filters of said first and second colors in other ones of said second horizontal lines.

* * * * *